United States Patent [19]

Posnansky

[11] 4,099,514

[45] Jul. 11, 1978

[54] METHOD AND APPARATUS FOR HEATING A FLUID MEDIUM BY MEANS OF SOLAR ENERGY

[76] Inventor: Mario Posnansky, Pappelweg 4, 3072 Ostermundigen (Canton of Berne), Switzerland

[21] Appl. No.: 684,189

[22] Filed: May 7, 1976

Related U.S. Application Data

[63] Continuation-in-part of Ser. No. 537,677, Dec. 30, 1974, abandoned.

[51] Int. Cl.² .............................................. F24J 3/02
[52] U.S. Cl. .................................... 126/270; 126/271
[58] Field of Search ............... 126/270, 271; 237/1 A

[56] References Cited

U.S. PATENT DOCUMENTS

| | | |
|---|---|---|
| 1,575,309 | 3/1926 | Anderson ............................ 126/271 |
| 1,989,999 | 2/1935 | Niederle .............................. 126/271 |
| 2,460,482 | 2/1949 | Abbot ................................. 126/271 |
| 3,107,052 | 10/1963 | Garrison .............................. 126/271 |
| 3,908,632 | 9/1975 | Poulsen ............................... 126/271 |
| 3,923,039 | 12/1975 | Falbel ................................. 126/271 |
| 3,939,819 | 2/1976 | Minardi ............................... 126/271 |
| 3,951,128 | 4/1976 | Schoenfelder ....................... 126/271 |
| 3,981,293 | 9/1976 | Gillery ................................ 126/271 |

*Primary Examiner*—Kenneth W. Sprague
*Assistant Examiner*—James C. Yeung

[57] ABSTRACT

A solar energy collection system and method for its utilization which is particularly efficient in collecting solar energy which has been concentrated at least up to 80 times, including a light focusing means, a single hollow receiver positioned to receive the focused rays directed from the focusing means with the receiver being transparent to the rays and an absorptive fluid medium.

9 Claims, 6 Drawing Figures

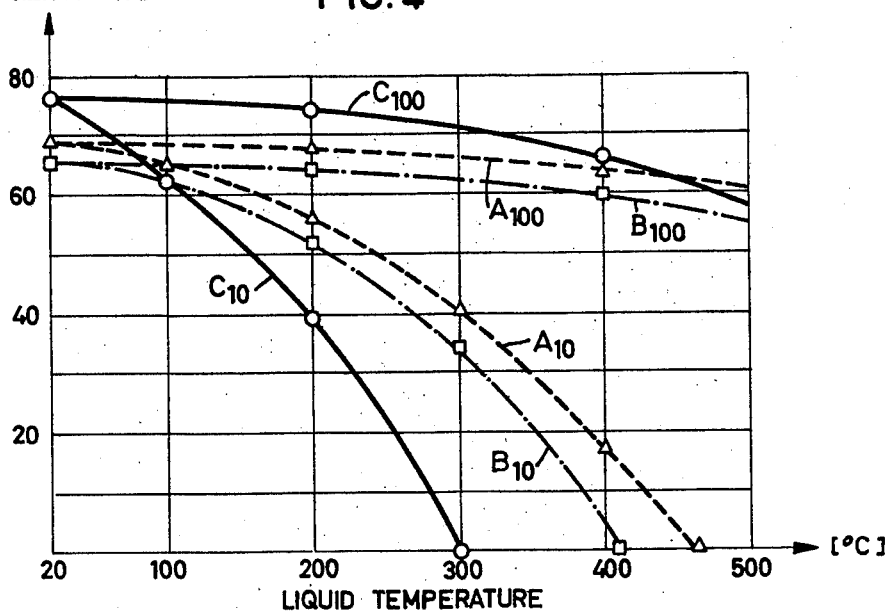
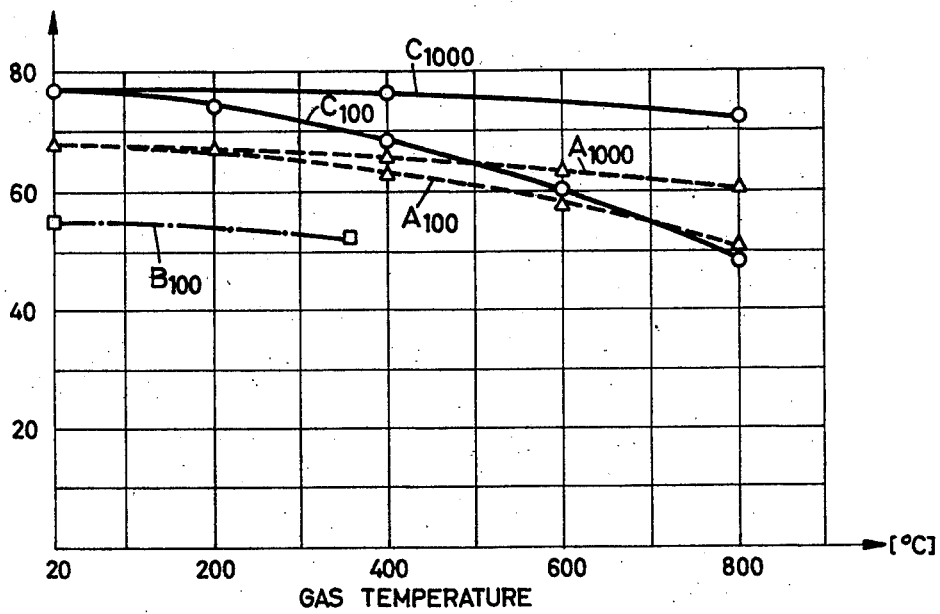

METHOD AND APPARATUS FOR HEATING A FLUID MEDIUM BY MEANS OF SOLAR ENERGY

This invention relates to a solar energy collector and is a Continuation-In-Part of U.S. patent application Ser. No. 537,677, filed Dec. 30, 1974, abandoned, in the name of the inventor.

Solar energy collectors utilizing black bodies is already known, but all suffer from disadvantages of one sort or another. In U.S. Pat. No. 2,872,915, issued to Bowen, a solar receiver having a black tube disposed along the focal line of the receiver is disclosed. A similar device has been manufactured by Sandia Laboratories, Albuquerque, New Mexico. These devices suffer from a substantial loss of efficiency as the concentration of solar radiation increases particularly at concentration values of 100 or greater. Because of the increasing heat at these high concentrations, the black receiver may actually melt.

Another prior art device is disclosed in U.S. Pat. No. 2,460,482, issued to Abbot, a black fluid is utilized in conjunction with a cumbersome series of transparent tubes.

While the Abbot system does not suffer from the difficulties inherent in the black body approach, it is cumbersome and difficult to manufacture.

The system of this invention provides a simple, high efficiency means for collecting high concentration solar energy, including a focusing means, a single hollow transparent receiver and a black fluid. Preferably this system includes recirculating means for removing the energy from the heated black fluid and returning it to the irradiation site.

In a particularly desirable embodiment, the receiving means is a thick, transparent optical lens which helps in focusing and concentrating the solar energy impinging thereupon.

The focusing means, while forming a part of the subject inventive system, are well knownand are not particularly novel per se. For example, moderate concentration ratios of up to 60 can be achieved with parabolic cylindrical concentrators, whereas high concentrations on the order of 100–2,000 are provided by paraboloidal or tower-top focusing mirrors. Higher concentration ratios up to 10,000 are limited to optically precise paraboloidal mirrors. (The term concentration, as used throughout this specification, indicates the ratio of the amount of radiation falling on a given defined surface area after radiation has been focused as compared to the amount of radiation which would normally fall on the same surface area without focusing of the random rays. In other words, a concentration of 50 means that 50 times more radiation has been impinging upon a defined surface area than would have been impinging upon it without focusing.)

The receiver or receptacle is made of a material which allows the suns rays and the wavelength of 0.2–3 microns to pass through without substantial absorption, so that these rays can impinge directly upon the absorbing medium. Suitable material for the transparent receiver are quartz glass, lead glass or hardened glass.

By black fluid it is meant a fluid which efficiently absorbs solar energy. Fluids having absorption factors higher than 50% and generally higher than 80% are especially desirable. Suitable black fluids are water which contains a dye stuff or a pulverized solid or colored gases such as iodine or bromine or gases such as ammonia or carbon dioxide which contain suspended coloring matter. It is also possible, of course, to use a black fluid or black gas in combination with a transparent gas and this variance is contemplated as being within the scope of this invention.

The system as a whole, and particular embodiments thereof, can be readily understood by reference to the drawings in which:

FIG. 4 is a graph showing the efficiency of the function of the temperature of a liquid absorbing carrier of the prior art embodiments described above and of the subject invention compared at different concentrations;

FIG. 5 is a graph of the efficiency as a function of the temperature of a gaseous absorbing heat layer of the prior art embodiments as compared to the embodiment of the subject invention at differing concentrations;

Figure 1:
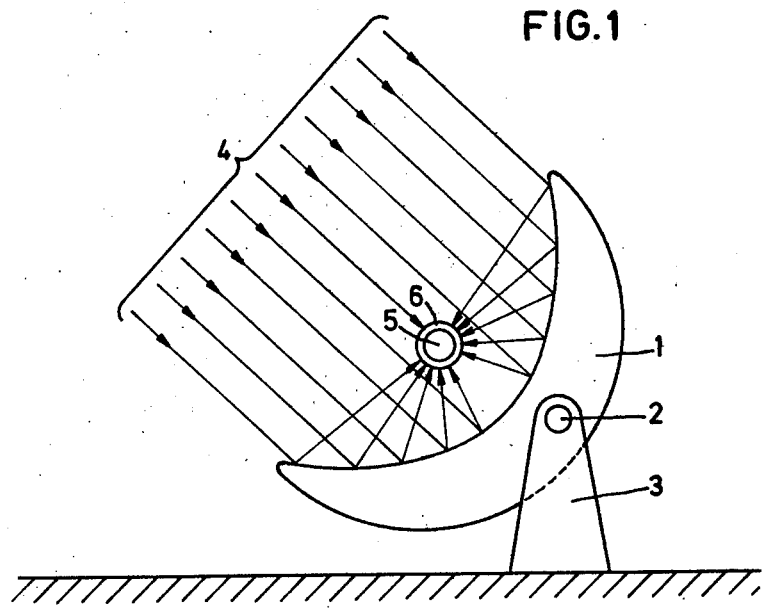
FIG. 1 is a schematic view of an apparatus for concentrating solar rays on a receiver containing a black fluid.

FIG. 1 shows a parabolic cylindrical reflector 1 pivotally mounted on an axis 2 depending from a support 3 so that the reflector may be adjusted according to the position of the sun. The solar radiation 4 striking the reflector 1 is concentrated along a focal line 5 (represented in FIG. 1 by a point.) A tubular receiver 6 is disposed along the focal line 5 so that the focal line and the center line of the receiver coincide. A fluid medium is conveyed through the tubular receiver 6. The receiver forms a part of a closed cycle which may comprise e.g. a pump for recirculating the medium and a heat exchanger of a similar device for utilizing the thermal energy absorbed by the medium itself.

If a parabolic reflector is used instead of the parabolic cylindrical reflector 1, a hollow sphere made of quartz glass will be used as the receiver 6. This hollow sphere will then be connected to an inlet pipr for supplying the medium as well as an outlet pipe for drawing off the heated medium.

Figure 2:
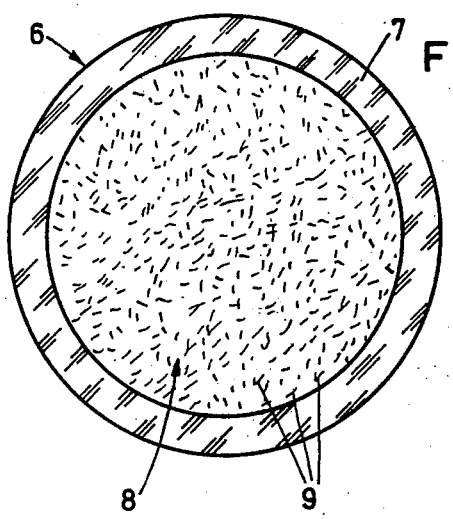
FIG. 2 is a cross-section through the receiver containing an absorbing heat layer.

As shown in FIG. 2, the tubular receiver 7, which is particularly suitable for use with the parabolic cylindrical reflector 1 as shown in FIG. 1 is characterized by the wall which is exposed to direct solar radiation being flattened. This allows the direct radiation to reach the medium within the receiver 6 unhindered.

Figure 3:
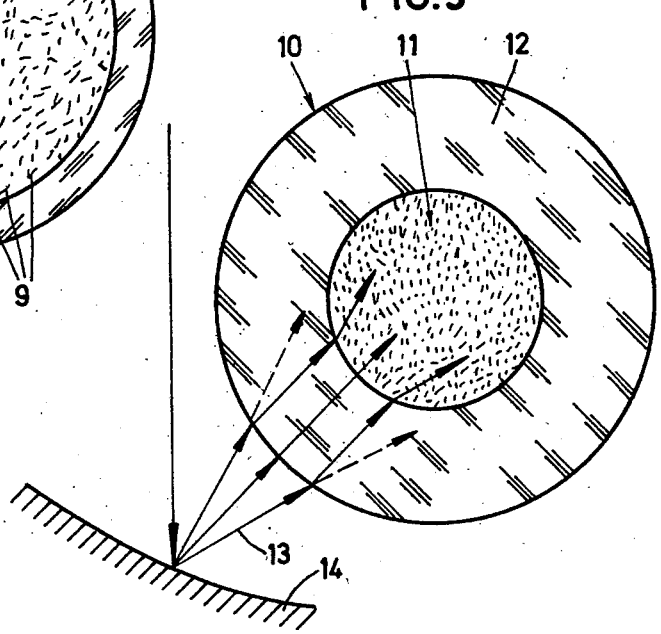
FIG. 3 is a cross-section through another embodiment of the receiver having walls of a greater thickness.

The tubular receiver 10 shown in FIG. 3 is a particularly preferred embodiment. The permeability of the material utilized for the production of the receiver 10 is chosen so that is does not allow longer wave infrared radiation to pass through. The advantage of this embodiment is that radiation from within the receptacle can be substantially decreased because when the medium inside the receptacle is heated to about 600° C. long wave reradiation would normally take place.

A further advantage of this receiver is that the wall 12 of the receiver 10 acts as a collecting lens so that any reflected rays not properly directed may be redirected so that they reach at least part of the inside of the receiver occupied by the medium. This embodiment and feature is particularly advantageous because the quality requirements for the parabolic cylindrical reflector, then, need not be that stringent and the resultant cost of producing the system as a whole may be substantially reduced. Concomitantly, all of the tolerances may be eased because of this additional focusing means.

Figure 6:
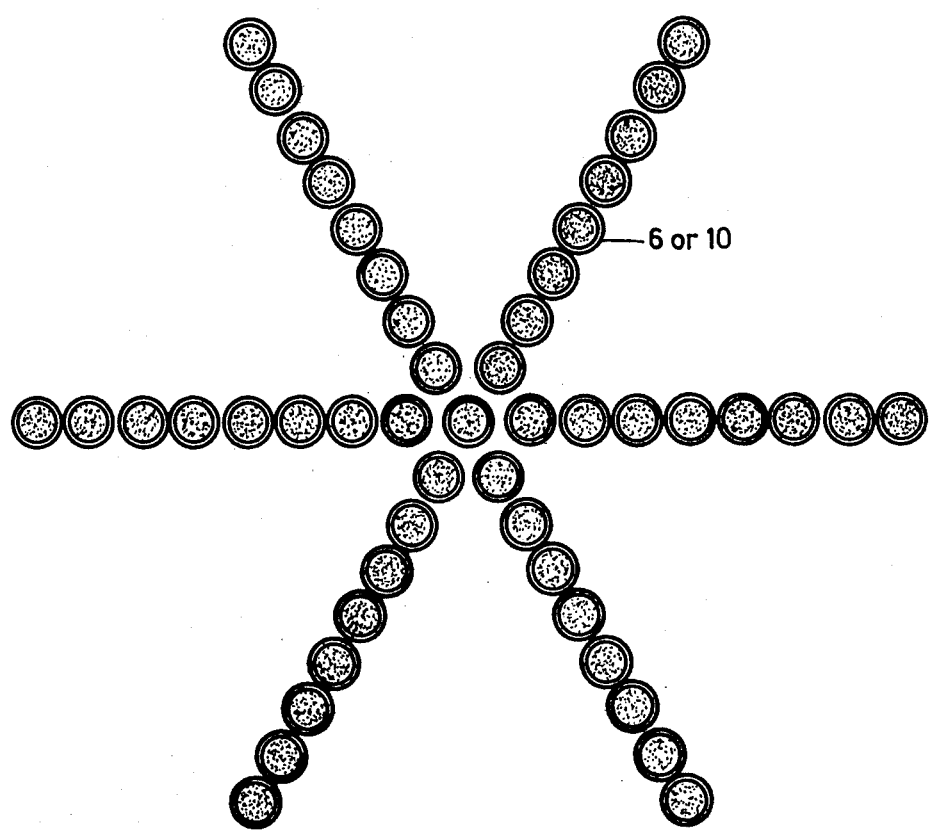
FIG. 6 is an arrangement of a plurality of receivers according to FIGS. 2 or 3 which is suitable for the construction of high efficiency systems.

FIG. 6 shows a series of receivers so that any of the incidental rays which may be reflected by the receivers may find their way to a different receiver. This cumulative effect produces a high efficiency of 75–80%. This arrangement of receivers which may be disposed in the area of concentration of radiation of a large installation can be utilized to produce a heat flux of 1,000–2,000 kW/cm$^2$.

Turning now to FIG. 4, the figure represents the collection efficiency in percent as a function of the temperature of a liquid medium as a heat carrier. The values indicated by the curves $C_{10}$ and $C_{100}$ are obtained by the configuration of the present invention while the values indicated by the dotted curves $B_{10}$ and $B_{100}$ are obtained by the device shown in Abbot's U.S. Pat. No. 2,133,649. The values illustrated by cotted curves $A_{10}$ and $A_{100}$ can be obtained by a device produced by Sandia Laboratories, Albuquerque, New Mexico which entails the use of black tubes as solar receivers which is similar in concept to one of the embodiments discussed in the Bowen patent. (For a description of the Sandia system utilized in both FIGS. 4 and 5, reference should be had to Sandia Laboratories Energy Report designated Sand 75-5333 entitled "Test Results From a Parabolic-Cylindrical Solar Collector" and written by G. W. Treadwell, W. H. McCulloch and R. S. Rusk.) In the Abbot system, two concentrically disposed glass tubes are used with the inner glass tube having a liquid medium absorbent of solar radiation, while the Sandia system utilizes a black non-transparent tube coaxially disposed in a transparent glass tube. The C curve indicative of the subject invention utilizes a transparent tubular receiver 7 as shown in FIG. 2 having a liquid medium with an absorption factor of 80%. This value is considered a desirable one. The 12% efficiency loss in the glass tube is taken into consideration for all of the data as represented in both this figure and FIG. 5.

As can be seen from FIG. 4, when employing a liquid medium, the efficiency of the subject invention is greater than the other systems so compared with the concentration of 100% at least until a temperature of 400° C. is attained. It can also be seen that at low concentrations the subject invention is not as efficient as either of the other systems.

FIG. 5 compares a black gas medium in both the Abbot patent and the subject invention at concentrations of 100 and 1,000. Again, the simple receiver shown in FIG. 2 is employed for purposes of illustration of the subject invention. The abbreviated curve at $B_{100}$ and the lack of a B curve at 1,000 is illustrative of the problems associated with the solid absorber tube which reaches melting temperature before a reasonable heat flux can be established to enable the gas to heat up to more than 350° C. For energy fluxes on the order of 10,000, the only workable receiver is that of the subject invention which provides absorption by black gas. As can be seen, again, the higher the concentration values shown, the more efficient the system of the subject invention is when compared with the Abbot reference.

The high concentration system utilizing black gas, as can be seen from the above, are a particularly advantageous embodiment of this invention. The high efficiencies and resultant high concentration levels provide for superior utilization of solar energy and a significant inventive contribution in this most important field.

What I claim is:

1. A method for collection of solar energy comprising:
   a. focusing solar radiation on a transparent hollow receiver, said receiver containing an energy absorbent colored gas;
   b. heating said fluid by said focused solar energy, to a temperature of at least 350° C;
   c. recirculating said colored gas to remove its collected energy and provide for solar energy reabsorption.

2. The method of claim 1, in which said colored gas is heated to a temperature of about 600° C, and said receiver is made of material which is permeable only to short wave infra-red radiation.

3. The mtehod of claim 1, in which said colored gas is Iodine.

4. The method of claim 1, in which said colored gas is Bromine.

5. The method of claim 1, in which said colored gas is Ammonia, containing suspended energy absorbent matter.

6. A solar energy collection system particularly adapted to efficiently collect energy concentrated at least up to 80 times, consisting essentially of a light focusing means, a single hollow receiver positioned to receive focused rays directed from said focusing means, said receiver being transparent to said rays and a colored gas medium located within said receiver.

7. The system of claim 1 in which the receiver has a flattened surface directed toward the focusing means.

8. The system of claim 1, in which the receiver is tubular in shape and the surface thereof is flattened only at the area directed toward the focusing means.

9. The system of claim 1, in which the receiver is workable for absorption of heat energy fluxes on the order of 10,000.

* * * * *

UNITED STATES PATENT OFFICE
CERTIFICATE OF CORRECTION

PATENT NO. : 4,099,514
DATED : July 11, 1978
INVENTOR(S) : MARIO POSNANSKY

It is certified that error appears in the above-identified patent and that said Letters Patent are hereby corrected as shown below:

The following should be included on the cover sheet:

--[30] Foreign Application Priority Date Data:

January 7, 1974  Switzerland ... 113/74--

Signed and Sealed this

Twenty-seventh Day of March 1979

[SEAL]

Attest:

RUTH C. MASON
Attesting Officer

DONALD W. BANNER
Commissioner of Patents and Trademarks